Figure 1:
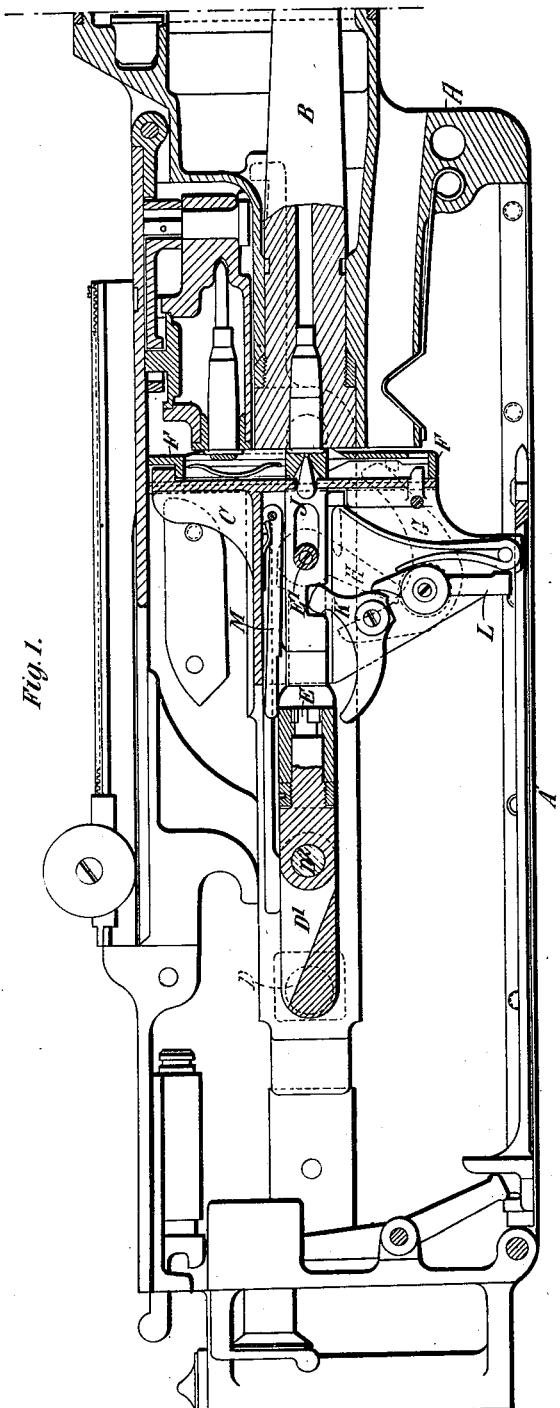

(No Model.)  11 Sheets—Sheet 1.

H. S. MAXIM.
RECOIL OPERATED GUN.

No. 579,401.  Patented Mar. 23, 1897.

Witnesses:
Raphaël Netter
James N. Catlow

Hiram S. Maxim, Inventor
by Parker W. Page. Attorney.

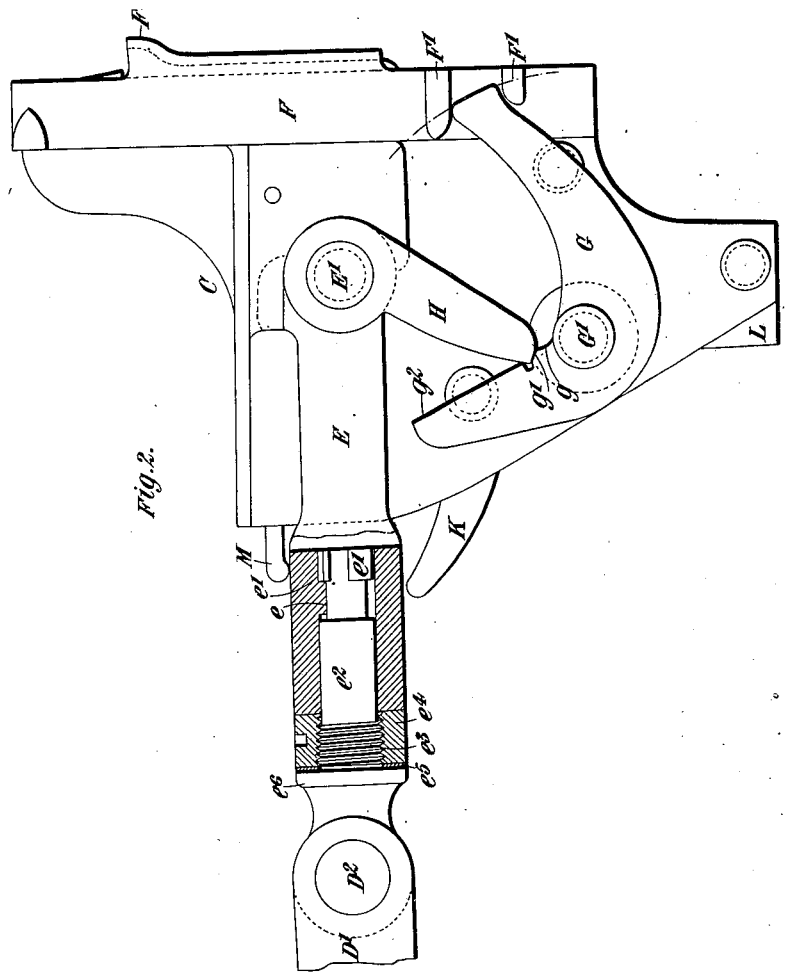

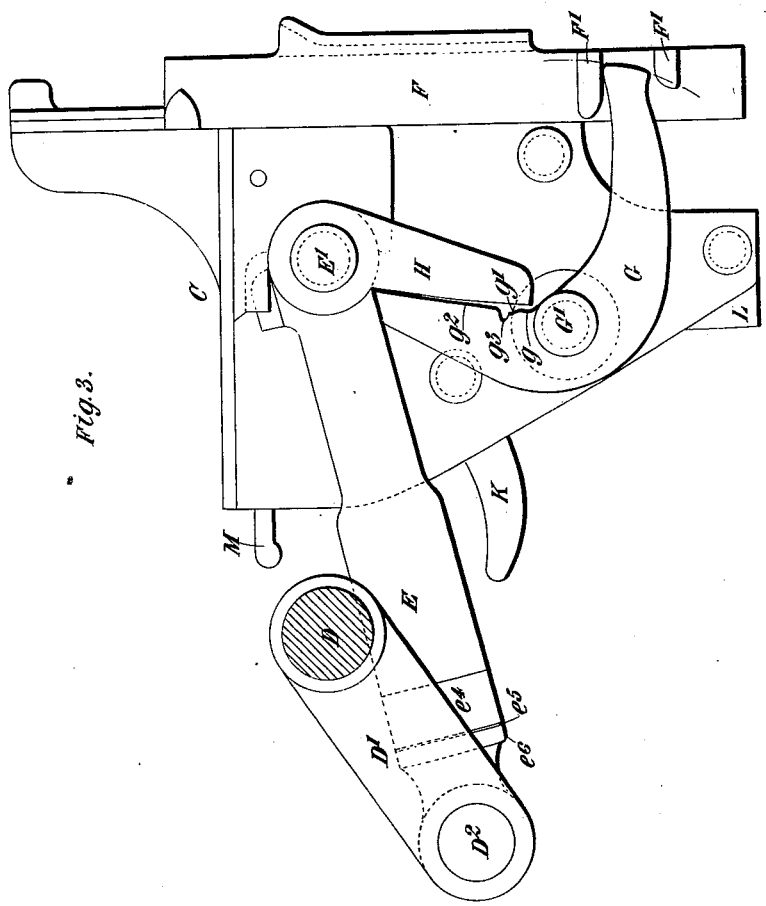

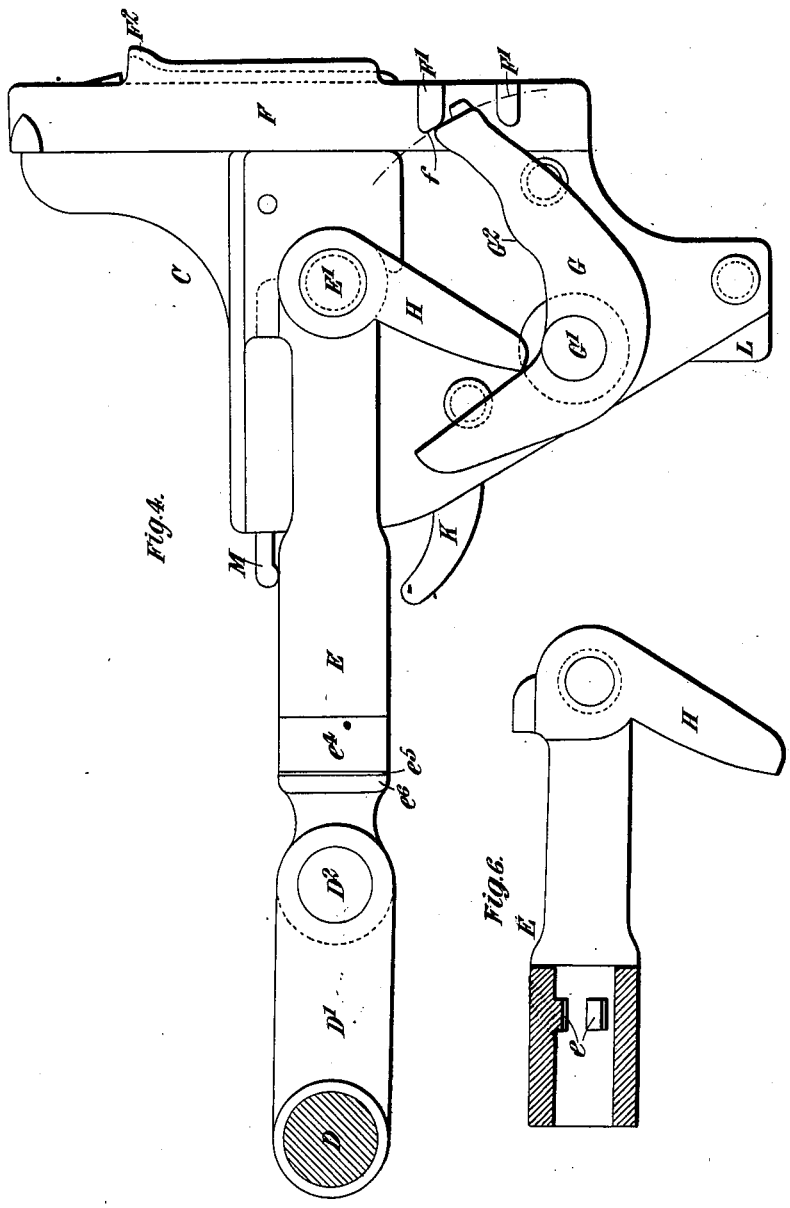

(No Model.) 11 Sheets—Sheet 5.
H. S. MAXIM.
RECOIL OPERATED GUN.
No. 579,401. Patented Mar. 23, 1897.
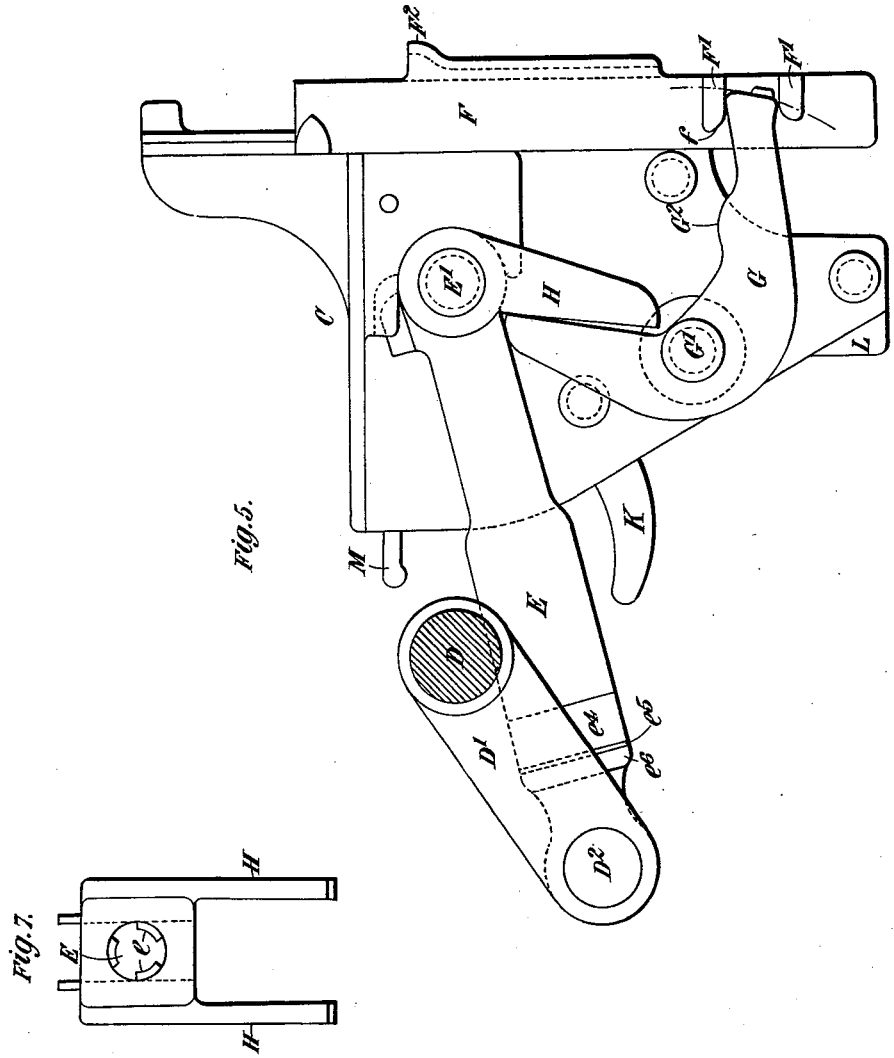
Witnesses:
Raphaël Netter
[signature]
Hiram S. Maxim, Inventor
by Parker W. Page, Attorney.

(No Model.)  
11 Sheets—Sheet 6.
H. S. MAXIM.
RECOIL OPERATED GUN.
No. 579,401.  
Patented Mar. 23, 1897.
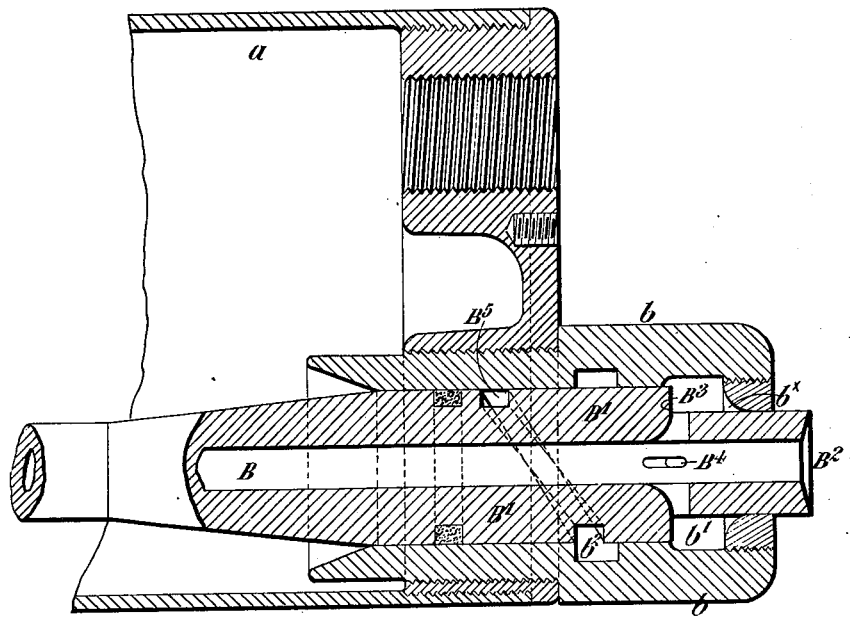
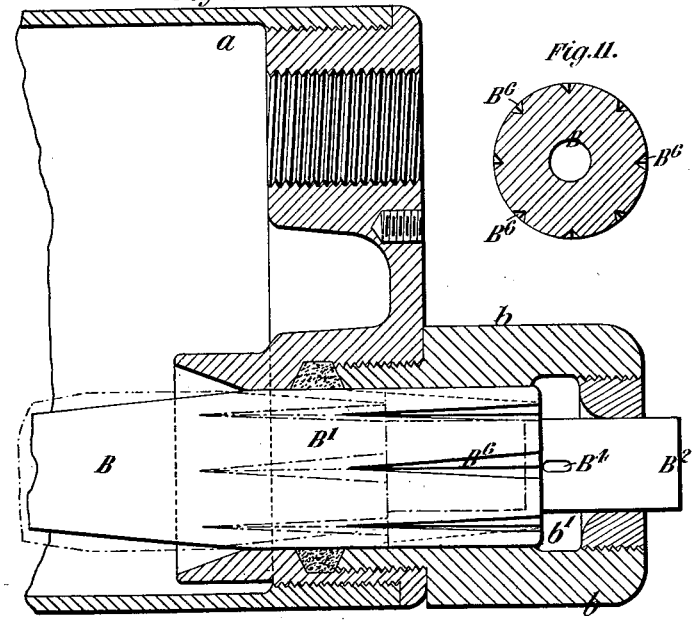
Witnesses:  
Raphaël Netter  
James W. Callant
Hiram S. Maxim, Inventor  
by Parker W. Page, Attorney.

(No Model.)

H. S. MAXIM.
RECOIL OPERATED GUN.

No. 579,401. Patented Mar. 23, 1897.

Witnesses:
Hiram S. Maxim, Inventor
by Parker W. Page. Att'y.

(No Model.) 11 Sheets—Sheet 8.
H. S. MAXIM.
RECOIL OPERATED GUN.
No. 579,401. Patented Mar. 23, 1897.
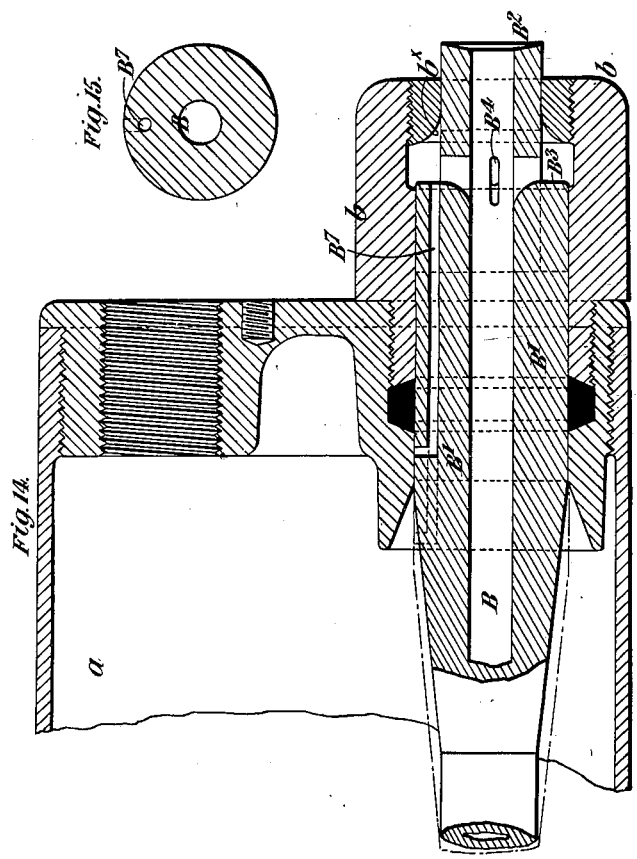
Witnesses:
Hiram S. Maxim, Inventor
by Parker W. Page, Attorney (No Model.)  11 Sheets—Sheet 9.
H. S. MAXIM.
RECOIL OPERATED GUN.
No. 579,401.  Patented Mar. 23, 1897.
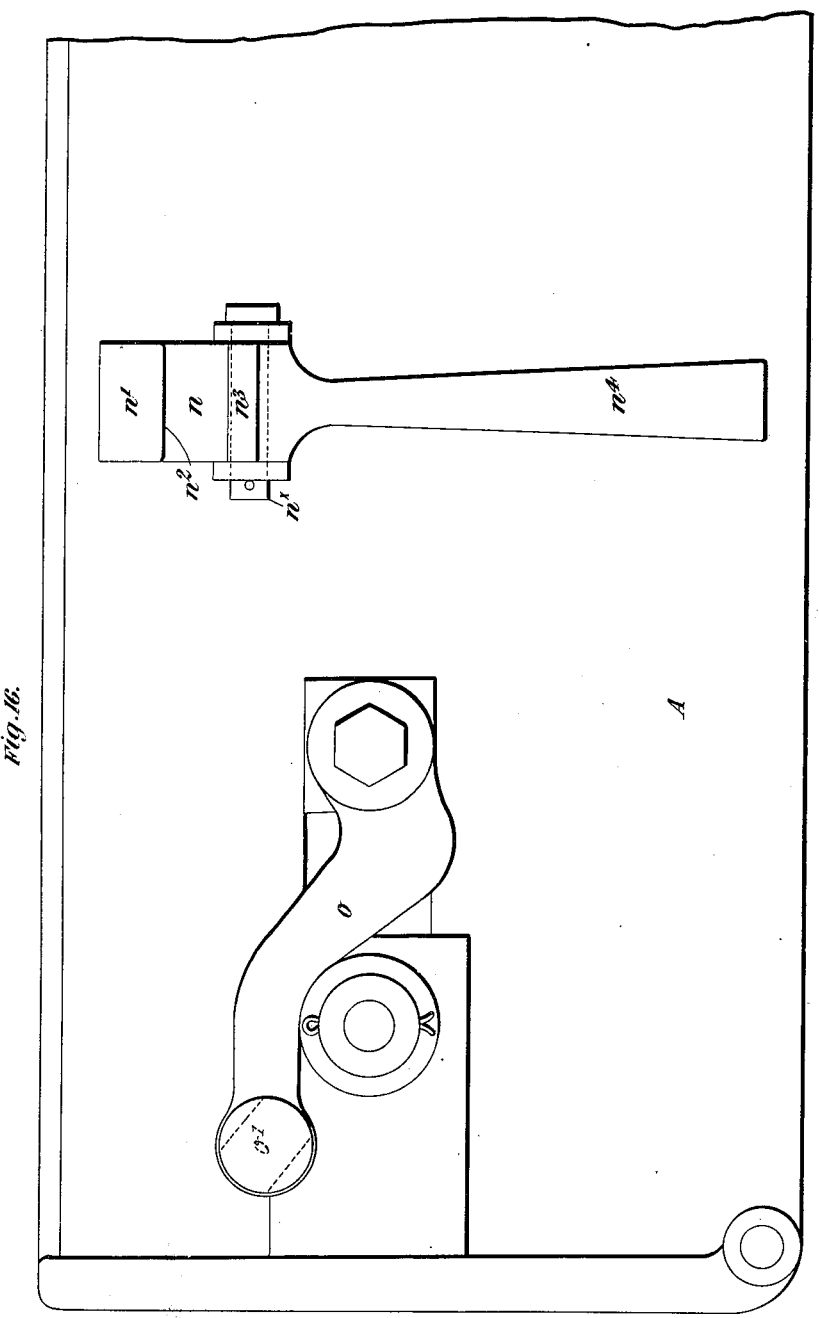
Witnesses:
Raphaël Netter
James M. Callow
Hiram S. Maxim, Inventor
by Parker W. Page, Attorney.

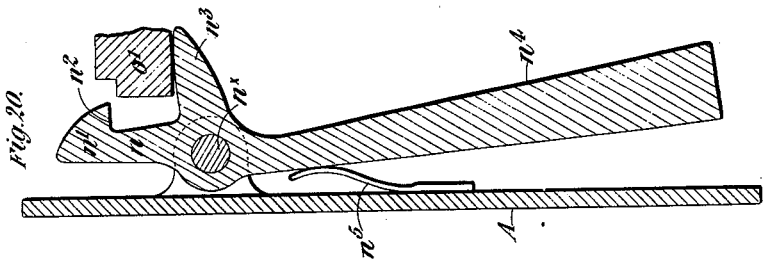
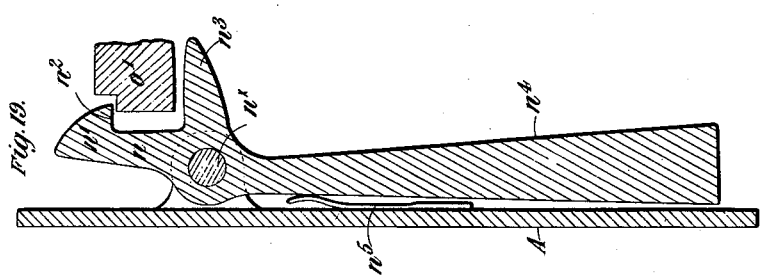
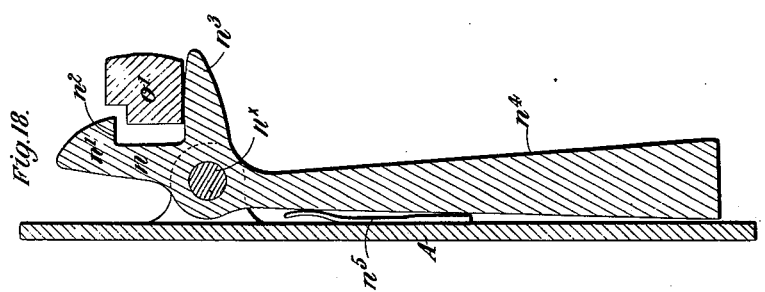
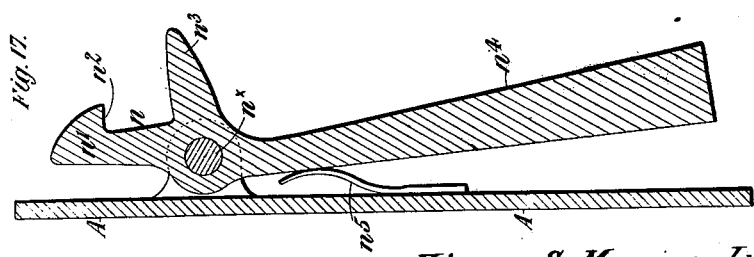

(No Model.) 11 Sheets—Sheet 11.
H. S. MAXIM.
RECOIL OPERATED GUN.
No. 579,401. Patented Mar. 23, 1897.
Fig. 21.
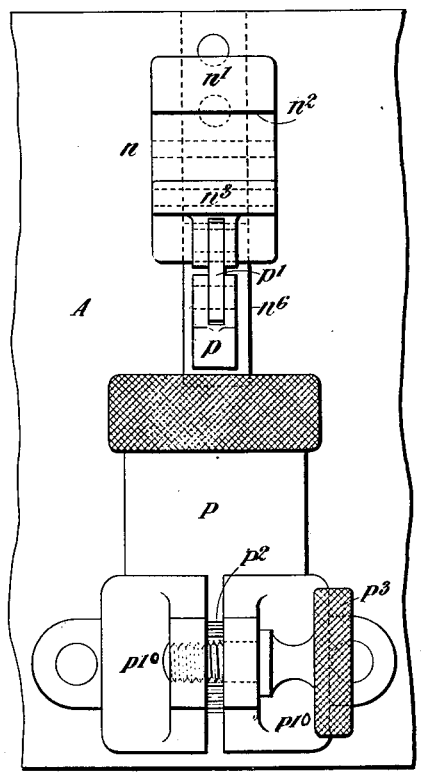
Fig. 22.
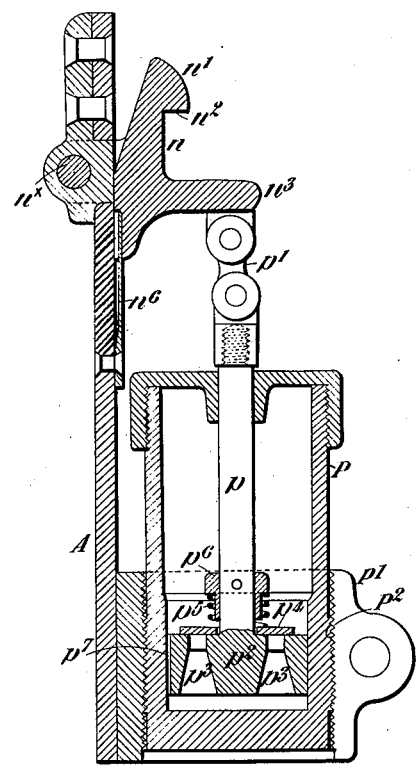
Fig. 23.
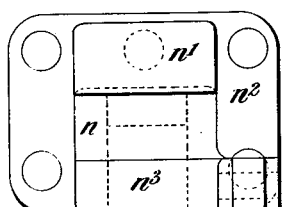
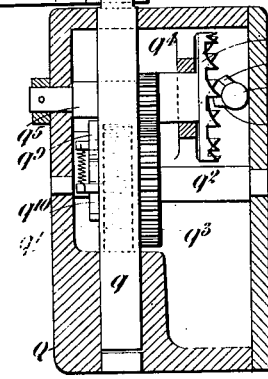
Fig. 24.
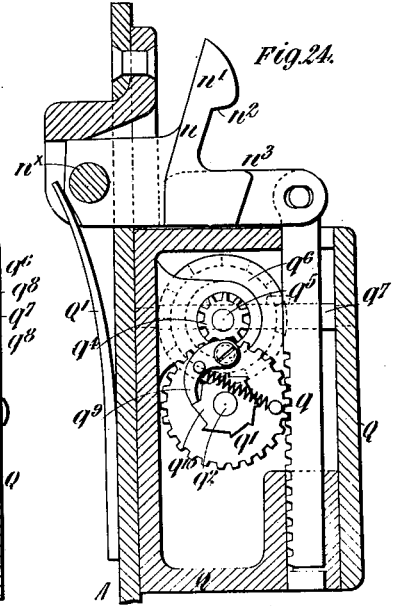
Witnesses:
Raphael Netter
James W. Callow
Hiram S. Maxim, Inventor
by Parker W. Page, Attorney

UNITED STATES PATENT OFFICE.

HIRAM STEVENS MAXIM, OF LONDON, ENGLAND.

RECOIL-OPERATED GUN.

SPECIFICATION forming part of Letters Patent No. 579,401, dated March 23, 1897.

Application filed January 22, 1896. Serial No. 576,436. (No model.) Patented in France December 17, 1895, No. 252,554; in Belgium December 18, 1895, No. 118,922; in Switzerland December 18, 1895, No. 11,655; in Italy December 21, 1895, LXXIX, 176; in Brazil February 4, 1896, No. 2,003; in Canada February 18, 1896, No. 51,386; in Austria March 26, 1896, No. 46/1,151, and in Argentine Republic April 10, 1896, No. 1,780.

*To all whom it may concern:*

Be it known that I, HIRAM STEVENS MAXIM, mechanical engineer, a citizen of the United States of America, residing at 18 Queen's Gate Place, London, England, have invented certain new and useful Improvements in Automatic Guns, of which the following is a specification, reference being had to the accompanying drawings.

I have obtained patents for this invention in the following countries: France, No. 252,554, dated December 17, 1895; Belgium, No. 118,922, dated December 18, 1895; Austria, No. 46/1,151, dated March 26, 1896; Italy, No. LXXIX, 176, dated December 21, 1895; Switzerland, No. 11,655, dated December 18, 1895; Argentine Republic, No. 1,780, dated April 10, 1896; Canada, No. 51,386, dated February 18, 1896, and Brazil, No. 2,003, dated February 4, 1896.

This invention relates to automatic or "Maxim" guns, and has for one of its objects to devise improved means for actuating the cartridge-carrier whereby the latter is caused to entirely complete its upward movement before the breech block or lock terminates its forward movement in closing the breech.

Another object of my present invention is to so construct the muzzle device employed for increasing the energy of the recoil movement of the gun-barrel that a quantity of water can at each recoil of the barrel be caused to enter the gas-chamber of the aforesaid muzzle device and the passages communicating therewith for the purpose of preventing the corrosion or incrustation of these parts by the gases of discharge, and also for preventing the muzzle of the barrel and the muzzle device from becoming overheated.

A still further object of this invention is to devise improved means for controlling the speed of firing the gun.

Figure 9:
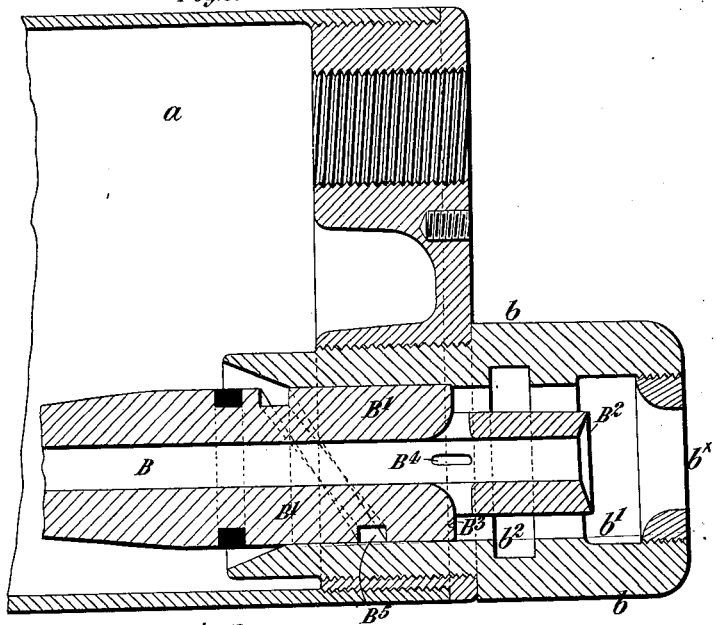
Figures 12, 13:
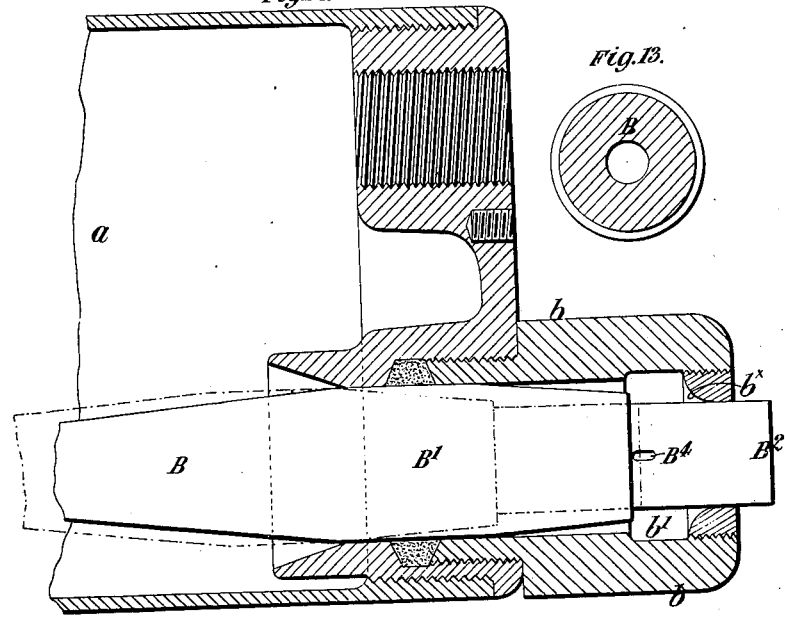

In the accompanying drawings, Figures 1 to 7 illustrate the improved means for actuating the cartridge-carrier, Fig. 1 being a longitudinal section of the breech mechanism of a gun provided with my improved cartridge-carrier; Fig. 2, a detached sectional elevation showing the breech block or lock and parts connected therewith in a firing position; Fig. 3, a similar view showing the parts in a recoiled position; Figs. 4 and 5, sectional elevations similar to Figs. 2 and 3, but showing a modified construction; and Figs. 6 and 7, a longitudinal section and rear end view of a detail hereinafter more fully referred to. Figs. 8 to 15 illustrate the muzzle device provided with means for admitting a quantity of water thereto each time the barrel recoils, Fig. 8 being a longitudinal section with the gun-barrel in its forward position; Fig. 9, a similar view with the gun-barrel in its recoiled position; Fig. 10, another longitudinal section showing a modification; Fig. 11, a transverse section of the gun-barrel employed in this modification. Figs. 12 and 13 are similar views to Figs. 10 and 11, but show another modification; and Figs. 14 and 15 are also similar views to Figs. 10 and 11, but show a still further modification. Figs. 16 to 24 illustrate the improved means or devices for controlling the speed of firing the gun. In these figures Fig. 16 is a side elevation of the rear portion of the gun, showing one of the said devices applied thereto, and Figs. 17, 18, 19, and 20 are central vertical sections of this device in different positions. Fig. 21 is a front elevation, and Fig. 22 a central vertical section, of a modified construction of the device. Fig. 23 is a front elevation, partly in section, and Fig. 24 a vertical section, of a further modified construction of the device.

I will first refer to that part of my invention relating to the means for actuating the cartridge-carrier.

In automatic or Maxim guns as at present constructed there is on the forward end of the breech block or lock a cartridge-carrier or sliding piece which acts to simultaneously withdraw the empty cartridge-case from the barrel and a fresh or loaded cartridge from the belt, then to lower the said cartridge and cartridge-case, then to thrust the fresh cartridge into the barrel and the empty cartridge-case out through the ejecting-orifice, and then, finally, to engage with another cartridge in the belt ready to repeat its cycle of operations upon the next discharge of the gun.

The said carrier thus has four movements—viz., a backward movement with the lock, a downward sliding movement on the lock, a forward movement with the lock, and, lastly, an upward sliding movement on the lock. In order that the last of these four movements may be properly performed, it is necessary to prevent undue pressure between the face of the carrier and the base of the cartridge. Otherwise the carrier would bind against the cartridge. Consequently the space usually left between the face of the carrier and the end of the gun-barrel when the carrier is in its most forward position is slightly in excess of the thickness of the flange or rim of the cartridge. It follows, therefore, that when the breech is closed the cartridge is not firmly supported. This evil is aggravated when modern smokeless powders are used, for in such instances the primers have to be made sufficiently thick to resist an enormous pressure, and therefore a very strong blow of the firing-pin is required to make them detonate. The force of this blow not only pushes the lock back, but also pushes the cartridge forward or away from the face of the carrier, and any lost motion in the parts or any allowance made for thick or dirty cartridges serves to increase the distance between the face of the carrier and the base of the cartridge, so that when the gun is fired the cartridge recoils through such distance, and this movement, together with that arising from the elasticity of the side plates, the crank, and the connections, will be sufficient in many cases, when the metal of the cartridge is not of the very best quality, to break the cartridge into two pieces, one of which remains in the cartridge-chamber and thereby stops the firing. In order to obviate this difficulty, I have according to my present invention devised means whereby the cartridge carrier or slide is caused to perform five functions instead of four, as heretofore—that is to say, it acts, first, to draw a cartridge from the belt; second, to lower it into position for loading; third, to thrust it into the barrel; fourth, to rise and seize a new cartridge, and, fifth, to close firmly against the base of the cartridge in the cartridge-chamber. The energy possessed by the crank at the moment of closing the breech and heretofore generally absorbed by the "dead-stop" is by this improvement utilized, through the toggle formed by the crank and its connecting-rod, to press the carrier firmly against the base of the cartridge, so that at the instant of firing the cartridge is firmly held in the cartridge-chamber and all lost motion is taken up. I provide means for adjusting the length of the said connecting-rod to accommodate cartridges having base-flanges of different thicknesses.

In the present most common forms of the Maxim gun the hand-sear is released just prior to the completion of the upward movement of the carrier, and the safety-sear is operated to release the firing-pin at the exact instant that the carrier reaches its highest position. This construction necessitates a very fine adjustment of the parts, and it is found that when slightly worn the parts get out of adjustment and do not properly operate; but with my present improvements, whereby the carrier first completes its vertical movement and then the crank-handle travels through an appreciable angle to press the carrier against the base of the cartridge, such very fine adjustment of the parts is unnecessary and the difficulty above indicated is avoided. Moreover, the present improvements obviate the inconvenience sometimes heretofore caused by the rebounding of the carrier after it has been fully raised, thus bringing the firing-pin hole in the carrier a little below the center of the primer. In such cases the action of the firing-pin is interfered with and the said pin is sometimes broken.

The spring that is generally attached to one of the inside plates of the gun and that engages with a notch in the carrier and holds it in its uppermost position at the instant of firing may be dispensed with.

Referring to Figs. 1 to 7 of the accompanying drawings, A is the frame inclosing the breech mechanism. B is the barrel. C is the breech-block or lock-body. D is the crank-shaft. D' is the crank. $D^2$ is the crank-pin. E is the connecting-rod coupling the crank to the lock. E' is the pin connecting the rod E to the lock. F is the cartridge-carrier mounted with a capability of sliding up and down on the forward end of the lock-body. G is one of the side levers for raising and lowering the cartridge-carrier. The said lever is pivoted to the lock-body at G'. F F' are lugs on the side of the cartridge-carrier, between which the forward end of the lever G works. H is an arm or finger forming part of the connecting-rod and adapted to operate the lever G. There is one such arm H and one such lever G on each side of the lock. J is the firing-pin. K is the tumbler. L is the hand-sear. M is the safety-sear. Except as hereinafter described all of the aforesaid parts are constructed and operate as heretofore.

Referring now to Figs. 2 and 3, the lever G is constructed with a working face $g$, (against which the end of the arm H bears during the greater part of the to-and-fro movement of the lock,) a curved face $g'$, inclined to the face $g$, and a face $g^2$, the plane of which is behind the plane of the face $g$. The corner between the curved face $g'$ and the face $g^2$ may be recessed, as indicated at $g^3$, or the said two faces may be constructed to merge one into the other. The radius of curvature of the face $g'$ is equal to the length of the arm H, measured from the center of its pivot to its extreme end, which is curved to the same radius. In some instances the face $g'$ is made straight instead of curved. During the first part of the forward movement of the lock from the extreme position of recoil (shown in Fig. 3) the extreme end or corner of the nearly vertical arm of the lever G rests against the arm H at a point near the pivot of the latter. Hence during such movement the lever G turns through a very small angle, but after the crank-pin D² has passed its lowest position and begins to rise toward the position shown in Fig. 2 the point of contact between the arm H and lever G is transferred to the extreme end or corner of the arm H, which then bears against the face $g$ of the lever G at a point substantially in the line joining the centers of the pivots E' and G'. During the continued forward movement of the lock therefore the lever G is rapidly turned about its pivot G', and the carrier F is caused to slide on the block into a position where it engages with a fresh cartridge in the belt. To insure the engagement of the carrier with the rim of the cartridge, I make the upper end of the flange of the carrier inclined, as shown at F². Since the lever G turns about the pivot G' and the arm H about the pivot E', it follows that during the rising movement of the cartridge-carrier the point of contact of the arm H and lever G moves away from the line joining the centers of the pivots E' and G', and hence the corner of the arm H gradually slides along the face $g$ away from the pivot G' until it reaches the end of the said face $g$ and escapes past the corner formed by the faces $g$ and $g'$. The carrier F then ceases to rise, and the end of the arm H during the last stage of the forward movement of the lock slides over the curved face $g'$ of the lever G, which face by bearing against the end of the arm H serves to firmly support the carrier F in its raised position. It is during this final stage of the movement of the lock after the carrier F has risen to its highest position that the connecting-rod E operates to raise the safety-sear M, thereby enabling the gun to be fired by the pressing of the button, which operates the hand-sear L in the usual manner. Moreover, during this final stage of the movement of the lock the face of the carrier F is pressed tightly against the base of the cartridge and the end of the barrel by the toggle-like action of the crank D' and connecting-rod E. In order to regulate this action as may be required, I provide for varying slightly the length of the connecting-rod as follows: The rear end of that part of the said rod shown in Figs. 6 and 7 is made tubular and is furnished with inwardly-projecting lugs $e$, equally spaced, as shown in Fig. 7, and adapted to engage with similar equally-spaced lugs $e'$, Fig. 2, on the stem $e^2$ of the other part of the connecting-rod, which stem enters the tubular part and is enlarged at its rear end to form an eye through which the crank-pin D² is passed. By sliding the tubular part of the connecting-rod over the stem $e^2$, so that the lugs $e$ pass through the spaces between the lugs $e'$ on the stem $e^2$, and then by turning the tubular part of the connecting-rod through a fraction of a revolution, so that the lugs $e$ pass behind the lugs $e'$, the said tubular part of the rod can be locked to the other part of the rod. The stem $e^2$ is screw-threaded at $e^3$ to receive a nut $e^4$, which forms an abutment for the end of the tubular part of the rod E. By screwing this nut one way or the other the distance between the centers D² E' can be lengthened or shortened, and the pressure of the lock against the end of the cartridge or of the barrel when the breech is closed can thereby be regulated.

The length of the neck or annular space formed in the stem $e^2$ behind the lugs $e'$ is greater than the length of the lugs $e$, and hence the latter can move axially on the spindle in accordance with the adjustments of the nut $e^4$. A hardened-steel washer $e^5$ is introduced between the nut $e^4$ and the shoulder $e^6$ to receive the thrust. Washers of different thicknesses are used to suit the thickness of the flanges of the cartridges. According to the modification of this part of my invention illustrated in Figs. 4 and 5 I dispense with the inclined face $g'$ of the lever G, and I effect my object as follows—that is to say, I provide the uppermost lug F' of the carrier F with a curved face $f$, the radius of which is equal to the length of the forward arm of the lever G, measured from the center of its pivot-pin, and I make the end of said arm also curved to the same radius, so that when the carrier F has been moved upward as far as it is required to go the end of the lever G escapes from the lower face of the upper lug F' and slides onto the curved face $f$, and it then ceases to lift the carrier, although the lever continues to move during the final closing movement of the lock. In this position of the lock the lever acts as a strut to support the carrier very firmly in its raised position. During the recoil movement of the lock the arm H strikes a projection G² on the lever G and turns the said lever until its forward end again passes between the lugs F' F', whereupon the carrier F can descend in accordance with the requirements of the working of the gun.

In both of the above-described devices it will be seen that the last portion of the travel of the toggle-joint formed by the crank and connecting-rod (i. e., when it is assuming the position in which the greatest purchase or effect upon the breech-block is obtained) is utilized for closing the breech and not for raising the carrier. Moreover, it is impossible for the carrier after being raised to its highest point to descend until released by the recoil movement of the connecting-rod, thus preventing any damage to the firing-pin.

By the present improvements it will be seen, moreover, that all of the parts that act to hold the cartridge in the barrel at the instant of firing are put into the best position for offering the greatest resistance to the stress due to discharge before the cartridge is struck by the firing-pin. These improvements are applicable to guns wherein the energy for working the parts is derived from the recoil of the barrel or from the recoil of the barrel assisted by the pressure of the escaping gases acting on a piston arranged near the muzzle of the gun or from such pressure alone.

I will now describe the means for enabling water to be admitted to the muzzle device each time the gun-barrel recoils, reference being had to Figs. 8 to 15. In these figures $a$ is the casing of the water-jacket, B the gun-barrel, and $b$ the gas-chamber, surrounding the muzzle of the barrel. The barrel is enlarged at B' and has transverse apertures $B^4$ immediately in front of the shoulder $B^3$, produced by the enlarged portion B'. Through these apertures the gases of discharge escape from the barrel and enter the space $b'$ in the gas-chamber $b$, thereby forcing back the barrel and finally escaping through the opening $b^\times$ in the gas-chamber $b$, when the barrel recoils sufficiently to bring its nose $B^2$ fully within the said gas-chamber, as is well understood. In Figs. 8 and 9 the aforesaid enlarged portion B' of the barrel is formed with an external semispiral passage $B^5$, which communicates at its forward end with an annular space $b^2$ within the gas-chamber $b$. When the barrel recoils into the position indicated in Fig. 9, the rearward end of the aforesaid passage $B^5$ is open to the water within the casing $a$. This passage therefore becomes filled with water, and on the barrel regaining its firing position, Fig. 8, the water within the said passage enters the annular space $b^2$. At the next recoil movement of the barrel the shoulder $B^3$ uncovers this annular space $b^2$ and allows the water contained therein to flow into the gas-chamber $b$. The water accumulating in the gas-chamber escapes through the front opening $b^\times$.

In the modified arrangement shown at Figs. 10 and 11 the enlarged portion B' of the barrel is provided with longitudinal tapering passages $B^6$. When the barrel recoils, it assumes the position indicated by the dotted lines in Fig. 10, thereby putting the said tapered passages $B^6$ into communication with the water in the casing $a$. The water then flows directly into the gas-chamber $b$.

In Figs. 12 and 13 I accomplish the same result by forming the enlarged portion B' of the barrel with a conically-shaped forward end, and in Figs. 14 and 15 I form the enlarged portion B' with a longitudinal passage or conduit $B^7$.

I will now describe the improved means I employ for controlling the speed of firing the gun.

As is well known, the rapidity of fire of a Maxim gun is usually very high, and it is considered desirable in some instances to diminish such rapidity. For this purpose the buffer-spring usually employed for causing the crank handle or arm to instantly rebound and return to its firing position after each discharge is dispensed with, and in place thereof I employ a device consisting of a catch, which is pivoted to the side plate of the gun in such a position that at each forward stroke of the crank-arm a projection on the latter will engage with the said catch, whereby the crank-arm will be temporarily restrained from performing its rearward stroke until the catch is automatically disengaged from the aforesaid projection on the crank-arm. The duration of this restraint may be for only a short interval of time or for a comparatively long period, depending on the means employed with the said catch for its release. In the drawings I have shown various means for effecting the disengagement of the catch after the lapse of certain intervals of time, but I wish it to be understood that I do not confine myself to these specific means.

Referring first to Figs. 16 to 20, $n$ is the catch, pivoted by a pin $n^\times$ to lugs on the side plate A of the frame of the gun. The catch is provided with a head $n'$, having a shoulder $n^2$, and is also provided with a flange or finger $n^3$, projecting from its face. $n^4$ is a pendent arm extending from the catch and having an enlarged or weighted outer end. O is the crank-arm, and O' the projection thereon, which during the forward rotary stroke of the crank-arm acts in conjunction with the aforesaid catch to delay the speed of firing the gun. $n^5$ is a spring which tends to keep the pendent arm $n^4$ pressed outward or away from the side plate A, so that it normally occupies the position shown by Fig. 17. When the crank-arm is thrown forward during the firing of the gun, the projection O' passes the head $n'$ of the catch and forcibly strikes the flange or finger $n^3$, thereby turning the catch about its pivot into the position shown at Fig. 18, the pendent arm turning inward against the pressure of the spring $n^5$. The return stroke of the crank-arm will now be temporarily prevented by reason of the projection O' coming against the shoulder $n^2$, Fig. 19, and the parts will remain in this position until the elasticity of the spring $n^5$ has overcome the momentum of the weighted arm $n^4$ and returned it and the catch to the position represented in Fig. 20. The crank-arm is then immediately liberated and permitted to perform its return stroke under the action of the ordinary fusee-spring. By varying the weight of the pendent arm or by providing it with an adjustable sliding weight the time required to enable the aforesaid spring to react and return the weighted arm to its normal position may be increased or diminished; but in any case, according to this construction of the device, the periods of retardation are of comparatively short duration.

In Figs. 21 and 22 I have shown the catch provided with an adjustable device which enables the periods of retardation to be considerably prolonged beyond those obtainable with the preceding arrangement. In this construction instead of providing the catch with a weighted arm the flange or finger $n^3$ is connected to a piston-rod $p$ by a link $p'$. The piston-rod has a piston $p^2$, which works in a cylinder P, formed with two internal diameters. This cylinder is supported from the frame A of the gun by a socket or clip $p^{10}$, which is screw-threaded on its interior in correspondence with exterior screw-threads formed on the lower portion $P^2$ of the cylinder. By revolving the cylinder it can be caused to move up or down in the socket or clip independently of the piston and piston-rod, and in this way the position of the piston relatively to the two internal diameters of the cylinder can be readily adjusted. The piston is provided with ports $p^3$, whose upper ends are normally covered by a disk-valve $p^4$, controlled by a spiral spring $p^5$, which is situated between the said disk $p^4$ and a collar $p^6$ on the piston-rod. The cylinder contains water or other fluid. $n^6$ is a spring which tends to keep the catch in its disengaged position. When the flange or finger $n^3$ of the catch is struck by the projection $O'$ during the forward stroke of the crank-arm, the piston descends in the cylinder P without meeting with any undue resistance, the fluid on the under side of the piston readily escaping to the upper side thereof by passing through the ports $p^3$ and raising the disk-valve $p^4$. The return movement of the catch is, however, impeded by reason of the fluid above the piston being unable to pass back through the ports $p^3$ to reach the under side of the piston when the latter attempts to rise, the only course open to the fluid being through a duct $p^7$ or between the circumference of the piston and the inner surface of the cylinder. The disengagement of the crank-arm is thus retarded until sufficient fluid has passed from the upper to the under side of the piston to permit the shoulder $n^2$ on the catch to move out of the way of the projection on the crank-arm. By revolving the cylinder P the larger interior diameter thereof can, as already stated, be brought nearer to or farther from the piston, so that during the ascent of the said piston a longer or shorter space of time will elapse before it enters the larger diameter, and therefore before the fluid can find a more ready escape from the upper to the lower side of the piston by flowing through the annular space between the piston and the larger diameter of the cylinder. $P^3$ is a set-screw having a milled head for enabling the clip $p^{10}$ to tightly retain the cylinder in its adjusted position. By only partially filling the cylinder with water this device can be used for giving comparatively slight retardation to the crank-arm.

In Figs. 23 and 24 I have illustrated a further modified construction of the adjustable device for enabling the periods of retardation to be prolonged. In this case the catch is pivotally connected to a vertically-moving rack $q$, which gears with a toothed wheel $q'$, mounted loosely on a spindle $q^2$. This spindle also carries another toothed wheel $q^3$, which is keyed thereon and gears with a pinion $q^4$, carried by a spindle $q^5$, having at one end a crown or escape wheel $q^6$, forming part of a verge-escapement. $q^7$ is the verge, and $q^8$ the pallets thereon, which engage with the teeth of the escape-wheel during the revolution of the latter and control its speed, as is well understood. The aforesaid toothed wheel $q'$ carries a spring-pawl $q^9$, which gears with a ratchet-wheel $q^{10}$, keyed to the spindle $q^2$. The ratchet-wheel $q^{10}$ is so arranged that when the rack $q$ descends under the force of the blow struck on the flange or finger $n^3$ by the projection on the crank-arm the said rack revolves the wheel $q'$ in a direction to cause the pawl to run freely over the teeth of the ratchet-wheel without turning the spindle $q^2$, but in the ascent of the said rack and the consequent revolution of the wheel $q'$, with its pawl, in the opposite direction the spindle $q^2$ is revolved by the pawl and ratchet-wheel. The rotation of this spindle is, however, impeded by the escapement, and the release of the crank-arm by the catch is accordingly retarded. Q is a casing inclosing the mechanism, and $Q'$ a spring which acts upon the catch and tends to restore it to its disengaged position.

I claim—

1. In an automatic gun, the combination with a reciprocating breech mechanism, of a cartridge-carrier, and intermediate mechanical connections which raise the carrier to its highest position before the completion of the forward movement of the breech mechanism, as set forth.

2. In an automatic gun, the combination with a reciprocating lock and a crank-shaft and connecting-rod for imparting movement thereto, of a cartridge-carrier sliding transversely on the lock, connections between the said carrier and the mechanism for imparting movement to the lock adapted to move the carrier in correspondence with the movement of the lock and to raise the carrier to its highest position before the termination of the forward movement of the lock, as set forth.

3. In an automatic gun, the combination with a reciprocating lock, a crank-shaft, crank and connecting-rod imparting movement to the lock, of a cartridge-carrier sliding transversely on the lock, levers engaging with and controlling the transverse movement of the carrier, arms secured to the connecting-rod and engaging with said levers, the said levers and arms being so formed as to raise the carrier to its highest position before the lock has completed its forward movement, and to support the carrier in such position, as herein set forth.

4. In an automatic gun, the combination with the lock, and with the crank-shaft crank and connecting-rod for actuating the lock, of a cartridge-carrier arranged to slide transversely on the lock, levers for controlling the movements of the cartridge-carrier, arms secured to the connecting-rod for operating the said levers, and inclined faces $g'$ formed on the levers G which faces bear against the ends of the arms that operate the levers and serve to support the cartridge-carrier in its raised position without moving said carrier during the final stage of the forward movement of the lock, substantially as described.

5. In an automatic gun, the combination with the lock, and the crank-shaft and crank, of a connecting-rod coupling the crank to the lock, the length of the said connecting-rod being adjustable, for the purpose specified.

6. In an automatic gun, the combination with the lock, the crank and the crank-shaft, of a connecting-rod coupling the crank to the lock, said connecting-rod being made in two parts one furnished with a stem $e^2$ and the other made tubular to embrace the said stem and be locked thereon by means of lugs $e, e'$ formed on the tubular part and stem respectively, and a nut $e^4$ for adjusting the length of the connecting-rod, substantially as described.

7. In an automatic gun, the combination with the lock, the crank and the crank-shaft, of a connecting-rod coupling the crank to the lock, said connecting-rod being made in two parts one furnished with a stem $e^2$ and the other made tubular to embrace the said stem and be locked thereon by means of lugs $e, e'$ formed on the tubular part and stem respectively, a nut $e^4$ for adjusting the length of the connecting-rod, and a washer $e^5$ between the nut and a shoulder $e^6$ on the connecting-rod to receive the thrust, substantially as described.

8. In an automatic gun, the combination with the lock, crank, and crank-shaft, of a connecting-rod coupling the crank to the lock the length of which rod is adjustable by means of a nut, a cartridge-carrier arranged to slide up and down on the lock and controllable by levers pivoted to the sides of the lock, arms secured to the connecting-rod for operating said levers, means for stopping the lifting movement of the carrier before the termination of the forward movement of the lock, and means for firmly supporting the carrier in its raised position, substantially as described.

9. In an automatic gun, the combination with the barrel of a chamber into which a portion of gases of discharge issue, said chamber having two parts movable with respect to each other by the force of such gases and operating when so moved to actuate the breech mechanism, a water-chamber and a passage of communication between the water-chamber and the gas-chamber, controlled by the movement of a part of said chamber, as set forth.

10. In an automatic gun the construction of the gun-barrel with an external groove or passage near the muzzle, the said groove or passage being so arranged that when the barrel is in its fired position the fore end of the groove or passage opens into the gas-chamber of the muzzle device, and when the barrel is in its recoiled position the rear end of the said groove or passage opens into the water-jacket substantially as described.

11. In an automatic gun, the combination with the pivoted catch on the side plate or frame of the gun and the projection on the crank-arm, of a finger against which the aforesaid projection strikes as the crank-arm performs its forward movement, and a device for temporarily restraining the catch from releasing the crank-arm, substantially as described.

12. In an automatic gun, the combination with a projection $o'$ on the crank-arm, of a pivoted catch $n$ on the gun-frame, and having a spring-controlled and weighted pendent arm, substantially as described.

13. In an automatic gun the devices for controlling the speed of firing the gun, consisting of a pivoted catch carried by the side plate or frame of the gun, a projection on the crank-arm adapted to engage with the said catch at each forward stroke of the crank-arm, and means for temporarily restraining the catch from releasing the crank-arm, substantially as described.

In testimony whereof I have hereunto set my hand this 29th day of November, 1895.

HIRAM STEVENS MAXIM.

Witnesses:
JOSEPH LAKE,
ARTHUR A. BERGIN.